Nov. 3, 1964    G. L. RITENOUR ETAL    3,155,485
BENDING MOLD SHAPING RAIL WITH NON-MARRING INSERTS
Original Filed May 1, 1961    2 Sheets-Sheet 1

INVENTORS
GERALD L. RITENOUR and
ROBERT E. KUBITCHAN
BY
Oscar L. Spencer
ATTORNEY Nov. 3, 1964   G. L. RITENOUR ETAL   3,155,485
BENDING MOLD SHAPING RAIL WITH NON-MARRING INSERTS
Original Filed May 1, 1961   2 Sheets-Sheet 2
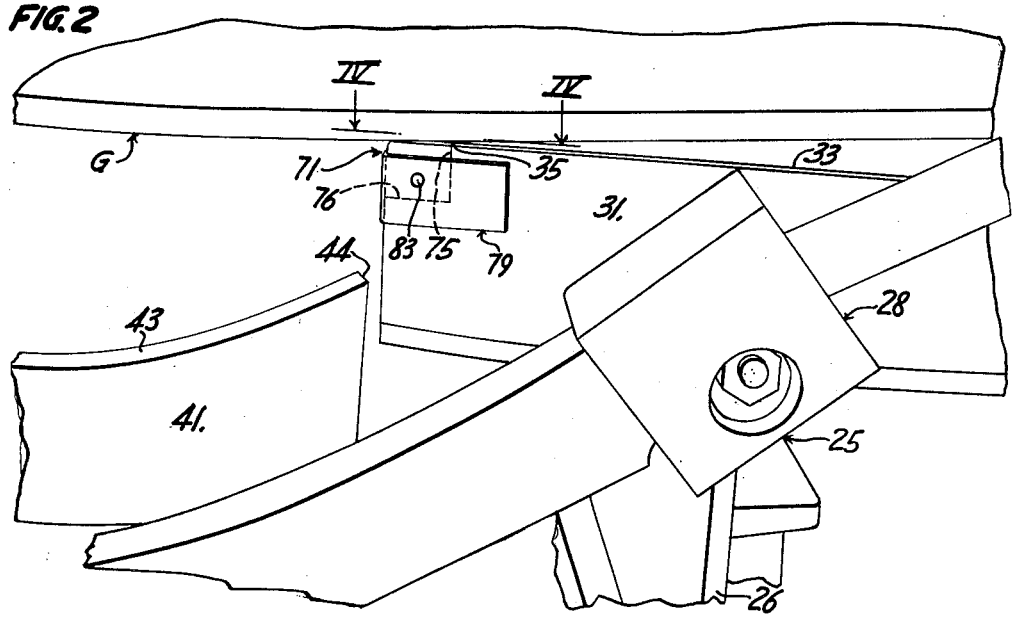
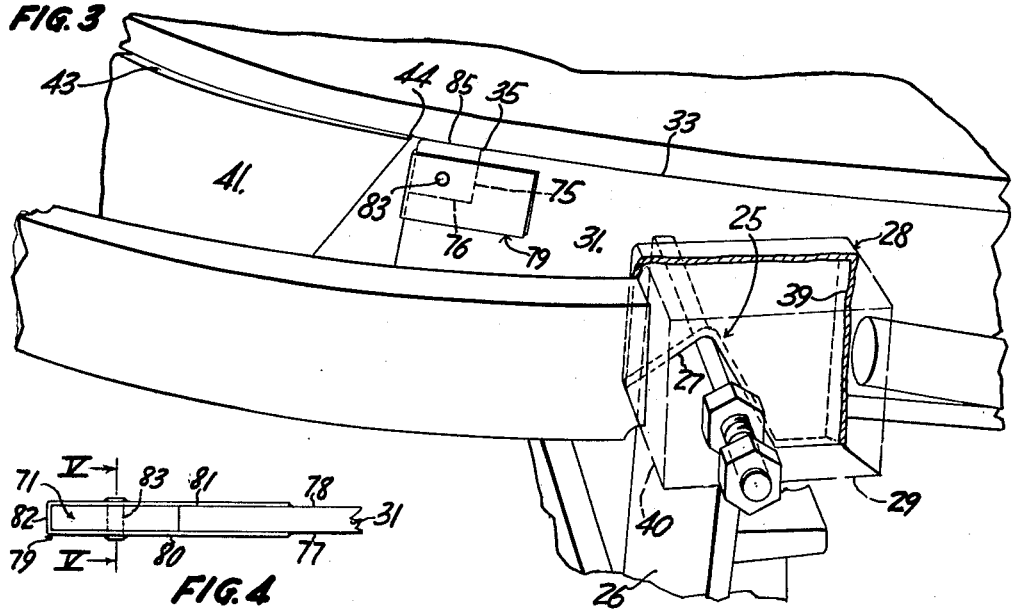
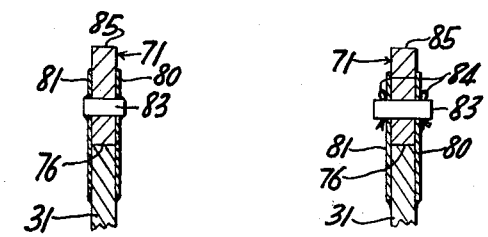
INVENTORS
GERALD L. RITENOUR and
ROBERT E. KUBITCHAN
BY
Oscar H Spencer
ATTORNEY 3,155,485
BENDING MOLD SHAPING RAIL WITH
NON-MARRING INSERTS
Gerald L. Ritenour, Natrona Heights, and Robert E. Kubichan, Creighton, Pa., assignors to Pittsburgh Plate Glass Company, Pittsburgh, Pa., a corporation of Pennsylvania
Continuation of abandoned application Ser. No. 106,927, May 1, 1961. This application Jan. 9, 1962, Ser. No. 165,191
6 Claims. (Cl. 65—291)

This is a continuation of application Serial No. 106,927, filed May 1, 1961, now abandoned.

This application relates to improvements in treating glass and particularly concerns improvements in molds for bending glass sheets to bending curves of varying radius including a relatively gently bent central portion merging into flanking regions that are sharply bent.

Bending techniques have been developed for bending glass sheets into such complex bending curvatures. These bending techniques involve the use of sectionalized molds of skeleton configuration conforming in elevation and outline to the shape of the curved glass sheet. The most effective molds of this type are concave in elevation and include a main molding member flanked by pivotable wing members.

The main molding member is located centrally of the mold and comprises a pair of laterally spaced, stainless steel shaping rails extending lengthwise of the mold. The upper surfaces of the shaping rails are concave in elevation to conform to the shape desired for the portion of bent glass sheet supported thereon after it is bent.

Each wing member comprises a curved, stainless steel rail extending longitudinally outwardly from adjacent a longitudinal extremity of one of the shaping rails of the main molding member around a longitudinal extremity of the mold and then longitudinally inwardly thereof toward a longitudinal extremity of the other shaping rail of the main molding member. The upper surface of each wing member is concave in elevation to conform to the shape of an end portion of the glass sheet after the latter is bent.

The wing members rotate downwardly into a spread mold position to support a flat glass sheet resting as a beam. Preferably the outer longitudinal extremities of the wing members support the flat glass sheet adjacent its longitudinal extremities and, in addition, the longitudinal extremities of the shaping rails of the main molding member support the flat glass sheet intermediate its extremities and adjacent its side edges to provide stable support for the flat glass sheet so that the latter does not tilt or become misaligned with respect to the mold shaping surface.

The wing members are preferably counterweighted to rotate upwardly. The counterweighting means employed with the wing members is so constructed and arranged that the upward lifting force they impart to the wing members to which they are operatively connected is insufficient to rotate the wing member upwardly while supporting a rigid sheet of plate glass or sheet glass having a nominal thickness of one-quarter inch. However, the size and disposition of the counterweights are such that they apply an upward lifting force to rotate the wing members upwardly while supporting the glass sheet after the latter has been softened by heat during a typical glass bending operation.

According to present commercial practice, sectionalized molds of the type described above are loaded with flat glass sheets and a succession of glass-laden molds are conveyed laterally through a tunnel-like lehr. In the lehr the molds are first conveyed through a preheat zone where they are exposed to successive regions of increasing temperatures until they reach a temperature below the glass-softening point. The molds are then conveyed through a glass bending zone heated to an elevated temperature pattern having spaced regions of relatively high temperatures. This latter temperature configuration is necessary because portions of the glass sheet to be bent most sharply are conveyed through the spaced regions of relatively intense heat while the less sharply bent portions are conveyed through regions of relatively less intense heat.

When glass-laden molds are subjected to glass-softening temperatures, the central portion of the supported glass sheet sags downwardly until its side portions contact the upper shaping surfaces of the shaping rails comprising the center molding member, while the wing members rotate upwardly in response to the softening of the glass into a closed mold position wherein their longitudinally inner extremities are adjacent to the longitudinal extremities of the center section rails. In this latter position the wing members and the shaping rails of the center molding member form a substantially continuous outline shaping surface conforming in elevation and contour to the shape desired for the bent glass. The wing members, by rotating upwardly into the closed mold position, lift the heat-softened glass sheet extremities from their flat to their curved configuration and impress their upper shaping surface onto the heat-softened glass sheet.

In the past as the flat glass sheets have sagged into a curved configuration, the portions resting initially on the longitudinal extremities of the stainless steel shaping rails of the central molding member became kinked as the stainless steel penetrated the undersurface of the heat-softened glass. In addition, marking, abrasion, fissures, and oxide inclusions resulted in the supported portions as the latter slid inwardly upon the stainless steel during bending.

The present invention has substantially eliminated the defects existing in the prior art by revising the construction of the shaping rails of the main or central molding member. This novel construction comprises a flat glass support member of a material that does not mar heat-softened glass attached to each extremity portion of one of said stainless steel shaping rails of the main molding member. Each flat glass support has an upper surface located in alignment with the upper shaping surface of the shaping rail to which it is attached and extends longitudinally outwardly of the upper shaping surface of its attached shaping rail, whereby the upper surface of the flat glass support member serves as a continuation of the upper shaping surface of the shaping rail.

The present invention arose when applicants ascribed the presence of the defects enumerated above to the material of the main molding member shaping rails.

In an illustrative embodiment of the best mode contemplated for carrying out the present invention, the flat glass support member is a block of graphitic carbon supported in a recessed end portion at each longitudinal extremity of each shaping rail of the main molding member.

The present invention will be understood better after reading a description of a particular embodiment thereof which follows. In the drawings forming part of the description of the illustrative embodiment wherein like reference numerals refer to identical structural elements throughout, FIG. 1 is a perspective view of a bending mold incorporating the present invention, showing one half of the bending mold in the open mold position and the other half of the mold in the closed position;

FIG. 2 is an enlarged perspective view of a portion of a mold showing a modified longitudinal extremity of a shaping rail of a main molding member and an adjacent portion of a wing member in the open position supporting a flat glass sheet for bending;

FIG. 3 is a perspective view of the same elements as shown in FIG. 2 showing the position they and the glass sheet occupy when the wing section has moved into the closed mold position with parts broken away to show certain structural details of a knife-edge bearing;

FIG. 4 is a plan view of a longitudinal extremity of a main molding member shaping rail as modified by the present invention looking in the direction IV—IV of FIG. 2;

FIG. 5 is a sectional view along the lines V—V of FIG. 4; and

FIG. 6 is a view similar to FIG. 5 of an alternate embodiment of the present invention.

Figure 1:
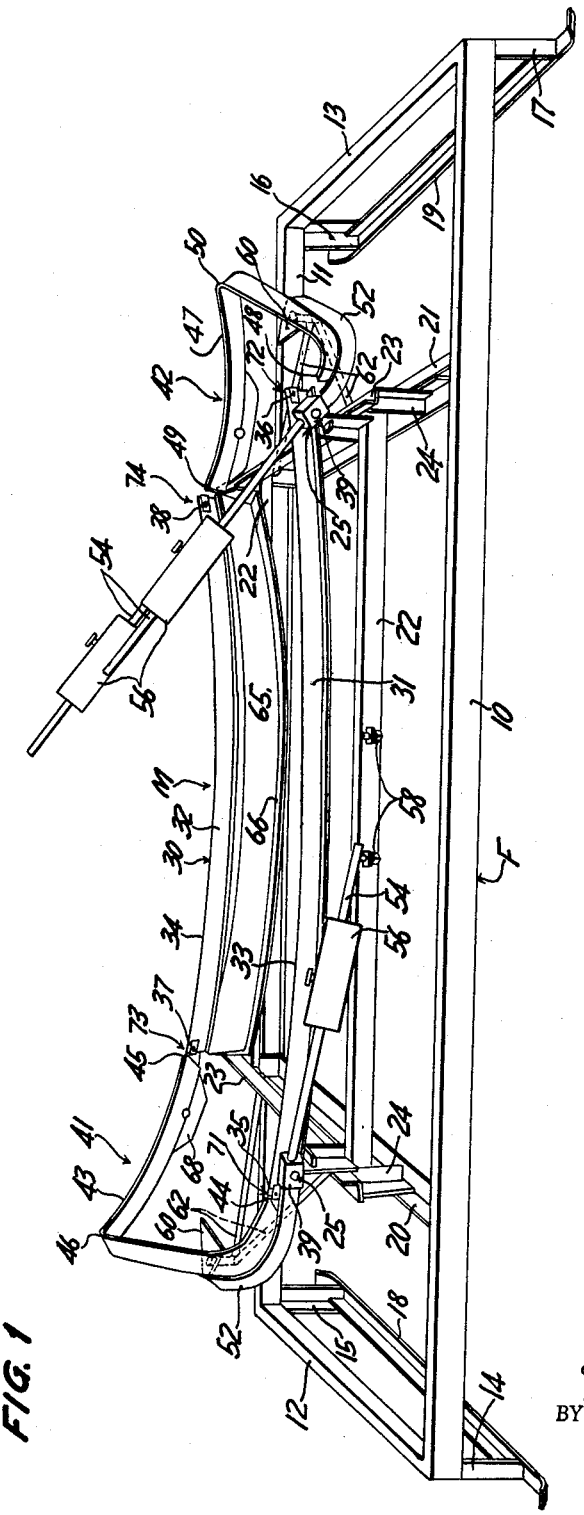

Referring to the drawings, particularly FIG. 1, M refers to a sectionalized bending mold according to the present invention. The mold is carried upon a support frame F. The latter comprises a pair of longitudinally extending side frame members 10 and 11 which are interconnected at their longitudinal extremities by transversely extending end frame members 12 and 13. Posts 14, 15, 16, and 17 are located at each corner of the frame and extend downwardly to interconnect the frame F with runners 18 and 19. Posts 14 and 16 attach runner 18 to one end frame member 12, while posts 15 and 17 attach runner 19 to the other end frame member 13. Runners 18 and 19 ride along the rolls of a stub roll conveyor (not shown) which conveys the frame F and its supported mold M through a bending lehr (not shown).

Additional cross beams 20 and 21 interconnect the longitudinally extending side frame members 10 and 11 intermediate the extremities thereof and are located slightly inwardly of the sharp axis of curvature defined by the shaping surface of the members comprising the mold M. Additional longitudinal beams 22 and additional transverse beams 23 form a superstructure in a plane above the plane occupied by the mold frame members 10, 11, 12, and 13. Four vertically extending members 24 provide a connection between each corner of the superstructure 22, 23 and the base frame 10, 11, 12, and 13 and support for four bearings 25.

Each of four knife-edge bearings 25 is of the type described and claimed in application Serial No. 833,778 of Harold E. McKelvey, filed August 14, 1959, for Improved Glass Sheet Bending Apparatus, and comprises a vertical knife-edge member 26 supported on superstructure 22, 23 and a grooved wall member 27 forming the laterally inner wall of an inverted box-like member 28 (see FIG. 3). The laterally outer wall 29 of the inverted box-like member 28 is apertured to loosely receive a bolt threaded onto a nut attached to the laterally outer, upper portion of knife-edge member 26.

The center mold section 30 comprises a pair of laterally spaced center section rails 31 and 32. Rail 31 has an upper edge 33 of relatively shallow curvature and rail 32 has an upper edge 34, also of relatively shallow curvature. The center section shaping rails 31 and 32 are of concave elevation and extend along the central portion of the laterally opposite longitudinally extending side edges of the mold to provide the central portion of an outline shaping surface. Reference numbers 35 and 36 depict the longitudinal extremities of upper edge 33, while reference numbers 37 and 38 are applied to the longitudinal extremities of upper edge 34. The four knife-edge bearings are located slightly longitudinally inwardly of longitudinal extremities 35, 36, 37, and 38, respectively, and below the upper edges 33 and 34, respectively.

Each inverted box-like member has a longitudinally inner wall 39 (FIG. 1) and a longitudinally outer wall 40 (FIG. 3) rigidly attached to one of the wing members 41 or 42. Wing members 41 and 42 are located beyond each longitudinal extremity of the center mold section. Wing member 41 is a substantially V-shaped rail disposed edgewise with an upper edge surface 43 providing the shape of one longitudinal extremity of the outline shaping surface. Wing member 41 extends from one inner longitudinal extremity 44 adjacent to but spaced from longitudinal extremity 35 of upper edge 33 to its other inner longitudinal extremity 45 which is located adjacent to but spaced from the longitudinal extremity 37 of upper edge 34. Wing member 41 extends continuously between its extremities 44 and 45 about an enclosed longitudinal outer extremity 46. Similarly, wing member 42 has an upper edge surface 47 that extends continuously from one inner longitudinal extremity 48 to its other longitudinal inner extremity 49 about an outer longitudinal extremity 50. The upper edge surfaces 43 and 47 are sharply bent adjacent their longitudinally inner extremities.

A metal strap 52 is attached at its longitudinally outer end portion to the bottom edge of each of the wing members 41 and 42. The longitudinally inner end portion of each metal strap 52 is secured to the longitudinally outer wall 40 of inverted box-like member 28. A weighted arm 54 is attached at its longitudinally outer end to the longitudinally inner wall 39 of each inverted box-like member 28. The weighted arms 54 extend longitudinally inwardly of the mold laterally outwardly of the center mold section and contain one or more weights 56 adjacent their longitudinally inner end portion. Conventional stop members 58 comprising adjustable set screws are located in the plane of rotation of the longitudinal inner extremity of each of the weighted arms 54. When the weighted arms 54 contact the upper surface of the stop members 58, further rotation of the wing members 41 and 42 is prevented.

Two stop members are shown mounted on the front longitudinal beam 22 shown in FIG 1. An additional pair of stop members are mounted on the rear longitudinal beam 22 but are incapable of being seen in the view depicted in FIG. 1.

The size and disposition of the weights 56 on the weighted arms 54 are such that they provide a net moment of force urging the wing members 41 and 42 and their supported glass sheet portions (of nominal thickness of one-quarter inch) to rotate upwardly into the closed mold position after the glass sheet has softened, but insufficient to rotate the wing sections upwardly while supporting the glass while rigid. When the glass softens, its rigidity decreases and the net moment provided by the weights 56 is sufficient to rotate the wing members 41 and 42 supporting the heat-softened glass sheet upwardly into the closed mold position and impress the shape of their upper surfaces 43 and 47 on the heat-softened glass. In the meantime the central portion of the glass sheet softens and sags into conformity with the upper edges 33 and 34 of the central center mold section shaping rails 31 and 32, respectively.

Conventional heat absorber members 60 are located beneath the area enclosed by the outer portion of the wing members 40 and 42. Support rods 62 are attached at their outer and upper ends to the absorber members 60 and extend obliquely downwardly and longitudinally inwardly to their inner ends. The latter are attached to the intermediate cross beams 20 and 21.

An additional conventional heat absorber member 64 which is a composite of a lower metal plate having a relatively large area 65 and an upper metal plate 66 having a relatively smaller area is supported by the frame by means of additional supporting elements secured to longitudinal beam 23 by cantilever elements (not shown). Additional metal heat absorber members 68 are attached along one side of the wing members 41 and 42 and are located along the side adjacent center section shaping rail 32 to cooperate with heat absorber member 64 in maintaining the side edge of the glass sheet ultimately supported on shaping rail 32 relatively free from transverse bending whereas the other side edge of the glass sheet ultimately supported on center section shaping rail 31 is free to soften and develop a transverse sag. The thickness of heat absorber member 68 and of each metal plate 65 and 66 is preferably about ⅛ inch for use with glass having a nominal thickness of one-quarter inch. This technique for producing a compound bend does not form part of my present invention and is merely incorporated in the present disclosure to provide a full description of an illustrative embodiment incorporating the present invention.

The improved construction of the present invention is provided by the flat glass supporting members 71, 72, 73, and 74 (FIG. 1) located at the longitudinal extremities 35, 36, 37, and 38, respectively, of main molding member shaping rails 31 and 32, respectively.

Referring particularly to FIGS 2 and 3, shaping rail 31 is recessed adjacent longitudinal extremity 35 of its upper shaping surface 33 to form a vertical wall 75 extending downwardly from shaping surface 33 to meet a horizontally extending edge 76, which forms the base of the recessed end portion. Shaping rail 31 has an outer major surface 77 and an inner major surface 78.

A flexible metal strap 79 comprising an outer leg 80 and an inner leg 81 interconnected by a cross piece 82 is attached to shaping rail 31 by welding the longitudinally inner extremity of outer leg 80 to the outer major surface 77 of shaping rail 31 and the longitudinally inner extremity of the inner leg 81 to the inner major surface 78 of shaping rail 31 to provide with the cross piece a channel encompassing the recessed end portion of the longitudinal extremity portion 35 of shaping rail 31. The flat glass support member 71 is fitted within the channel formed by the flexible metal strap 79 and is secured within said channel either by means of a rivet 83 welded at its longitudinal extremities to the legs 80 and 81 of the flexible metal strap 79 and extending through aligned apertures formed in the graphite block 71 and in the legs 80 and 81 of the flexible metal strap 79 as shown in FIG. 5, or by securing rivet 83 in place by means of cotter pins 84.

Each graphite block 71, 72, 73, or 74 has a size equal to that of a recessed end portion of shaping rail 31 and 32 and is constructed so that its longitudinally inner vertical wall abuts vertical wall 75 of the recessed end portion and its bottom edge rests upon the horizontally extended portion 76 of the recessed end portion of shaping rail 31 or 32. Each graphite block 71, 72, 73, or 74 has an upper edge surface 85 shaped to conform to the shaping surface of the extremity portion of the shaping surface of the shaping rail removed to form the recessed end portion.

The construction in FIG. 1 shows both shaping rails of the main or center molding member provided with recessed end portions and flat glass support members located at the recessed end portions. This is necessary when the nature of the bend to which a flat glass sheet conforms requires both longitudinally extending side edges of the glass sheet to sag from a flat to a curved configuration. In cases where one side edge of the glass sheet remains relatively flat while the other side is shaped to a curved configuration, the present invention requries only the rail supporting the portion of the glass sheet that slides over the intermediate support points as the glass is shaped be provided with the novel flat glass support members described above.

In a typical construction according to the present invention, a shaping rail of 3/16 inch thickness and 1½ inches in height had a recessed end portion 1 inch long and ¾ inch high at its upper longitudinal end corners and graphitic carbon blocks 1 inch long, ¾ inch high, and 3/16 inch thick inserted in the rabbeted portions. Metal straps 1/32 inch thick, 1 inch wide, and 4 inches long were wrapped around the graphitic carbon blocks and were spot welded to the major surfaces of the shaping rail at their longitudinal extremities. A ⅛ inch rod, ¼ inch long was inserted through apertures located approximately ⅜ inch below the shaping surface of graphitic carbon block and ⅜ inch longitudinally inwardly of the longitudinally outer extremity of the graphitic carbon block. The straps were secured in such a manner that the upper edge encompassing the graphitic carbon blocks were located about ¼ inch below the upper shaping surface provided by the shaping rail and the graphite block.

Many materials have been tested under temperature conditions simulating the glass bending cycle to determine their characteristic of marking glass during relative sliding at elevated temperature. This was accomplished by heating each glass sample (5½ inches by 9 inches by ¼ inch) while supported on a quartz plate ½ inch thick to a temperature of 1100 degrees Fahrenheit while loading samples of materials on the upper surface of the glass sample during its heating with a force of 2½ pounds applied through the sample. When the glass attained the desired temperature, the material sample was moved ¼ inch in sliding pressurized contact with the upper surface of the glass sheet. Then the entire apparatus including the tested sample and its supporting quartz plate was moved immediately to an insulated box where it was allowed to cool to room temperature.

Each sample was inspected visually for visible defects, which were recorded. The sample was then cut into a square shape about 2½ inches long on each side with the slid portion located centrally thereof. The sample was mounted concentrically over a ring of 2 inch diameter with its marked surface facing downwardly, and a downward force applied with gradually increasing intensity to the upper surface of the sample through a ring of ¾ inch diameter using an Instron Testing Machine, which records the pressure applied to the upper glass surface. Many samples of different materials were tested and compared to results obtained from control samples treated in a similar manner, except that the control samples were neither loaded nor rubbed ¼ inch as were the test samples. The results are summarized in Table I, which follows:

*Table I*

| Material Tested | Samples Tested | Visual Defects Present | Average Pressure at Breakage (Pounds per Square Inch) |
| --- | --- | --- | --- |
| Control Samples | 35 | None | 13,820 |
| Graphite Block | 9 | Very light abrasion | 11,420 |
| Tin Oxide Block | 11 | Light abrasion | 8,840 |
| Aluminum Silicate Block | 4 | Abrasion, heavy deposits | 8,610 |
| 90% Ag 10% Cu Sheet | 5 | Fusion, deep rub marks | 8,265 |
| Pt-Au Alloy Sheet | 6 | Fissures, heavy abrasion | 7,630 |
| Tungsten Block | 12 | Deposits, abrasion | 7,460 |
| Silver Block | 12 | Fusion, deep rub marks | 7,000 |
| Zirconium | 5 | Abrasion | 6,740 |
| Pressure Die Steel PD-3 Block | 7 | Abrasion, fissures, deposits | 6,390 |
| Pyrex Glass Block | 5 | Heavy abrasion, glass removal | 6,280 |
| Vacuum Melted Steel | 6 | Abrasion, fissures, deposits | 6,220 |
| 304 Stainless Steel Block.[1] | 11 | ___do___ | 5,960 |

[1] Material used for mold rails.

From Table I, graphite or carbon blocks have been found to be vastly superior to any other material tested. A superior graphite carbon composition employed is Stackpole Grade 741. This material is a molded carbon graphite having an apparent density of 1.8 grams per cubic centimeter, an average transfer strength of 8,000 pounds per square inch, a compressive strength of 21,000 pounds per square inch, a coefficient of thermal expansion of $2.8 \times 10^{-6}$ per degree Fahrenheit, a modulus of elasticity of $1.3 \times 10^{-6}$ pounds per square inch and an average Shore scleroscope hardness of 80.

Its chemical composition as determined by emission spectographic semi-quantitative analysis showed it consisted almost entirely of carbon with less than 0.9 percent by weight of phosphorous, less than 0.3 percent by weight of zinc, less than 0.2 percent by weight of each of sodium and strontium, and less than 0.1 percent by weight of each of aluminum, titanium, zirconium, antimony, boron, nickel, tin, vanadium, chromium, silicon, bismuth, barium, lead, iron, calcium, magnesium, copper, manganese, and silver.

Many variations within the inventive concept will become obvious in the light of the foregoing description. For example, the graphite blocks may be made pivotable such as described and claimed in a copending application Serial No. 106,926 of Malobicky and Jursa, filed May 1, 1961, for Treating Glass. These variations will become obvious in the light of the foregoing description. The embodiments described above have been for the purpose of illustration rather than limitation. Reference to the latter may be obtained by studying the following claimed subject matter.

What is claimed is:

1. In a sectionalized, skeletonized mold for bending glass sheets having an outline shaping surface of concave elevation including a main molding member, a pair of laterally spaced stainless steel shaping rails having upper shaping surfaces of concave elevation extending along the central portion of the laterally opposite, longitudinally extending side edges of said outline shaping surface and further including stainless steel wing members having upper shaping surfaces of concave elevation and having inner and outer longitudinal extremities, and means pivotally connecting said wing members to said main molding member for movement between a spread mold position and a closed mold position, the improvement comprising a flat glass support member of a material that does not mar heat-softened glass attached to each extremity portion of one of said stainless steel shaping rails, each said flat glass support member having an upper surface located in alignment with the upper shaping surface of said shaping rail and extending longitudinally outwardly of said upper shaping surface of said shaping rail, whereby the upper surface of said flat glass support member serves as a continuation of the upper shaping surface of said shaping rail.

2. The improvement according to claim 1, wherein each said flat glass support member is a block of graphite.

3. The improvement according to claim 2, wherein each longitudinal extremity portion of said shaping rail is recessed and said blocks of graphite are supported in each of said recessed end portions.

4. The improvement according to claim 3, wherein said blocks of graphite fit snugly within said recessed end portions.

5. The improvement according to claim 1, wherein one of said flat glass support members is attached to each longitudinal extremity of both said shaping rails.

6. The improvement according to claim 5, wherein said glass support members have their upper surfaces located in a common plane occupied by the outer longitudinal extremities of said wing members when the latter are pivoted into the spread mold position.

References Cited in the file of this patent
UNITED STATES PATENTS

| | | |
|---|---|---|
| 2,570,309 | Black | Oct. 9, 1951 |
| 2,691,854 | Rugg | Oct. 19, 1954 |
| 2,746,209 | Walters | May 22, 1956 |
| 2,953,871 | Peek | Sept. 27, 1960 |
| 3,037,324 | Carson | June 5, 1962 |